Patented Feb. 5, 1935

1,989,989

UNITED STATES PATENT OFFICE 1,989,989

PROCESS FOR THE MANUFACTURE OF NEW SULPHURIZED DERIVATIVES OF PHENOLS

Valentin Kartaschoff, Basel, Switzerland, assignor to the firm of Chemical Works formerly Sandoz, Basel, Switzerland No Drawing. Application July 22, 1931, Serial No. 552,563. In Germany August 2, 1930

6 Claims. (Cl. 260—18)

Various methods for the preparation of non-dyeing sulphurized derivatives of phenols are known. Such compounds may for instance be prepared by heating phenols with sulphur in presence of an alkali, or by treating phenols with sulphur chloride and transforming the obtained condensation products into water soluble salts by their heating with alkalis.

It is further known that metalliferous non-dyeing sulphurized derivatives of phenols may be prepared according to the processes described in the specifications of the U. S. patent applications Ser. No. 486,050, filed October 2, 1930, Ser. No. 521,399, filed March 9, 1931, and Ser. No. 526,562, filed March 30, 1931.

In further development of these processes it has been found that similar metalliferous thioderivatives of phenols can be obtained if instead of the phenols used in the previous specification their condensation products obtained by interaction of phenols other than those containing nitrogen, with sulphur halides are heated with compounds of polyvalent metals other than those of the earth-alkali group, in presence of basic reacting substances and eventually also in presence of sulphur.

The phenol derivatives the use of which is claimed in the present specification may easily be prepared by the known methods, for instance by treating phenols with sulphur chloride, whereby compounds like dihydroxydiphenyldisulphide are produced. It is also possible to use the derivatives of the above cited products which contain, besides one or two hydroxylic groups linked to the same benzene ring, alkyl, halogen, sulpho and carboxylic acid groups.

It is possible to treat phenols with sulphur chloride in absence or in presence of suitable diluting agents and to heat thereupon the sulphurized phenols thus obtained with an alkali in presence of suitable metal salts. Similar compounds are also obtained if mixtures of phenols and sulphur are treated at an elevated temperature in presence or in absence of catalyzers, with chlorine, and if the obtained condensation products are heated with an alkali in presence of suitable metal salts. The new metalliferous sulphurized phenols are obtained from the melt in form of their free thio acids or their alkali metal salts. The alkali metal salts of these compounds are easily soluble in water and possess mordanting, tanning and reserving properties and may further be employed as insecticides and as intermediate products for the manufacture of dyestuffs and pharmaceutical products.

The following examples, whilst being not limitative, illustrate the process; the parts being by weight.

Example 1

100 parts of phenol are treated at a temperature of 70–90° C. with 100 parts of sulphur chloride and allowed to cool down. The obtained mass is then carefully treated under good stirring with 20 parts of water, 80 parts of sodium hydroxide and 40 parts of tin chloride. The mixture thus obtained is then heated in a vessel provided with a reflux condenser, during 24 hours at 137–140° C. and the thick paste obtained is dried in vacuo. The product prepared in this manner constitutes in dry state a greenish-grey powder, easily soluble in water, yielding a yellowish solution, which on addition of diluted sulphuric acid gives in the cold a yellowish and in the heat an orange precipitate. On addition of acetic acid its aqueous solutions become yellow without any precipitate. The product possesses the property of preserving wool against the taking up of substantive and acid colors.

The tin chloride used in this example may be replaced by the equivalent quantity of metallic tin, preferably cut in small pieces, whereby quite a similar tin-containing compound is obtained.

Example 2

A mixture consisting of 180 parts of phenol and 60 parts of well powdered sulphur is heated to 130° C. and treated with dry chlorine, whereby the temperature rises up to 150–160° C. After 60 parts of chlorine have been taken up, 60 parts of sulphur are again added to the melt and the treatment with chlorine is continued until 140 parts of chlorine have been used. The obtained mass is then allowed to cool down to about 80° C. and is treated with 60 parts of sodium hydroxide and 40 parts of crystallized tin chloride and heated under good stirring during 24 hours to 130–140° C. After this time the melt is directly dried in vacuo.

The product thus obtained is easily soluble in alkaline solutions with a grey-brownish coloration. On addition of diluted sulphuric acid its solutions yield an olive grey, and on addition of acetic acid a grey precipitate. The condensation product prepared in this manner possesses valuable tanning properties.

By adding to the melt during the heating with alkali a certain amount of sulpur, higher sulphurized derivatives are obtained.

In the examples given above, the sodium hydroxide may be replaced by other alkaline reacting compounds, such as potassium hydroxide, sodium and potassium carbonates and calcium hydroxide. The tin salts used can also be replaced by other suitable metal salts, such as the salts of chromium, antimony, arsenic, zinc, molybdenum, aluminium, manganese, cobalt, nickel and others.

What I claim is:

1. A process for the manufacture of non-dyeing metalliferous derivatives of phenols, consisting in first causing phenols other than those containing nitrogen to react with sulphur chloride and heating the intermediate reaction product thus obtained with compounds of polyvalent metals which form water-insoluble precipitates with ammonium and hydrogen sulphides in presence of an alkali.

2. A process for the manufacture of non-dyeing metalliferous derivatives of phenols, consisting in first causing phenols other than those containing nitrogen to react with sulphur chloride and heating the intermediate reaction product thus obtained with compounds of polyvalent metals which form water-insoluble precipitates with ammonium and hydrogen sulphides in presence of an alkali and sulphur.

3. A process for the manufacture of non-dyeing metalliferous derivatives of phenols, consisting in first causing phenols other than those containing nitrogen to react with sulphur chloride and heating the intermediate reaction product thus obtained with inorganic tin compounds in presence of an alkali.

4. A process for the manufacture of non-dyeing tin-containing derivative of phenol, consisting in first causing phenol to react with sulphur chloride and heating the intermediate reaction product thus obtained with tin chloride in presence of sodium hydroxide.

5. The non-dyeing metalliferous derivatives of phenols, which are in dry state yellowish, grey-olive to brown powders, easily soluble in alkaline solutions, yielding with mineral acids yellowish to olive precipitates which do not dye textile fibres and which possess strong tanning and mordanting properties and yield with basic dyestuffs difficultly soluble lakes.

6. The non-dyeing tin-derivatives of phenols which are in dry state grey powders, easily soluble in alkaline solutions, these aqueous solutions yielding on addition of mineral acids grey to olive precipitates, but remaining clear on addition of dilute acetic acid, while taking a green coloration, which do not dye textile fibres and which possess strong tanning and mordanting properties and yield with basic dyestuffs difficultly soluble lakes.

VALENTIN KARTASCHOFF